United States Patent [19]

Otani et al.

[11] Patent Number: 5,724,157
[45] Date of Patent: Mar. 3, 1998

[54] FACSIMILE APPARATUS AND METHOD OUTPUTTING RESULTS OF FACSIMILE COMMUNICATION

[75] Inventors: Atsushi Otani, Tokyo; Katsutoshi Ushida, Yokohama, both of Japan

[73] Assignee: Canon Kabushiki Kaisha, Japan

[21] Appl. No.: 647,293

[22] Filed: May 9, 1996

Related U.S. Application Data

[63] Continuation of Ser. No. 225,974, Apr. 12, 1994, abandoned.

[30] Foreign Application Priority Data

Apr. 20, 1993 [JP] Japan .................... 5-092814

[51] Int. Cl.⁶ .................... H04N 1/387; H04N 1/40
[52] U.S. Cl. .................... 358/450; 358/451; 358/444; 358/426; 358/468
[58] Field of Search .................... 358/444, 404, 358/468, 426, 261.1, 261.3, 428, 400, 401, 403, 448, 451, 449, 434; 395/114, 115, 112, 116; 382/233, 232

[56] References Cited

U.S. PATENT DOCUMENTS

| | | | |
|---|---|---|---|
| 4,275,450 | 6/1981 | Potter | 358/451 |
| 4,924,324 | 5/1990 | Takaoka | 358/468 |
| 4,947,268 | 8/1990 | Nakajiri et al. | 358/426 |
| 5,001,572 | 3/1991 | Hashimoto et al. | 358/440 |
| 5,113,455 | 5/1992 | Scott | 358/451 |
| 5,126,850 | 6/1992 | Kato | 358/406 |
| 5,189,529 | 2/1993 | Ishiwata et al. | 358/451 |
| 5,191,440 | 3/1993 | Levine | 358/450 |
| 5,267,052 | 11/1993 | Bannai et al. | 358/426 |
| 5,299,027 | 3/1994 | Nakamura et al. | 358/444 |
| 5,317,416 | 5/1994 | Tsuboi et al. | 358/426 |
| 5,319,471 | 6/1994 | Takei et al. | 358/426 |
| 5,341,223 | 8/1994 | Shigeeda et al. | 358/400 |
| 5,341,413 | 8/1994 | Hori et al. | 358/444 |
| 5,402,248 | 3/1995 | Sato et al. | 358/426 |
| 5,539,843 | 7/1996 | Murakami et al. | 358/456 |

FOREIGN PATENT DOCUMENTS 0354791  2/1990  European Pat. Off. .

OTHER PUBLICATIONS

Pat.Abs.Jp., vol.8, No. 221 (E-271) Oct. 9, 1984 (JP-A-59104853).

*Primary Examiner*—Edward L. Coles, Sr.
*Assistant Examiner*—Fan Lee
*Attorney, Agent, or Firm*—Fitzpatrick, Cella, Harper & Scinto

[57] ABSTRACT

A facsimile apparatus is provided in which, when communication management data stored in a communication management-data storage unit and prescribed communication image data that has been stored in an accumulating memory are combined and outputted, required zoom processing is executed by a system controller and the communication management data and prescribed communication image data are combined and outputted in such a manner that the data will fit on one page.

40 Claims, 9 Drawing Sheets

FIG. 9A
(PRIOR ART)
FIG. 9B
(PRIOR ART)
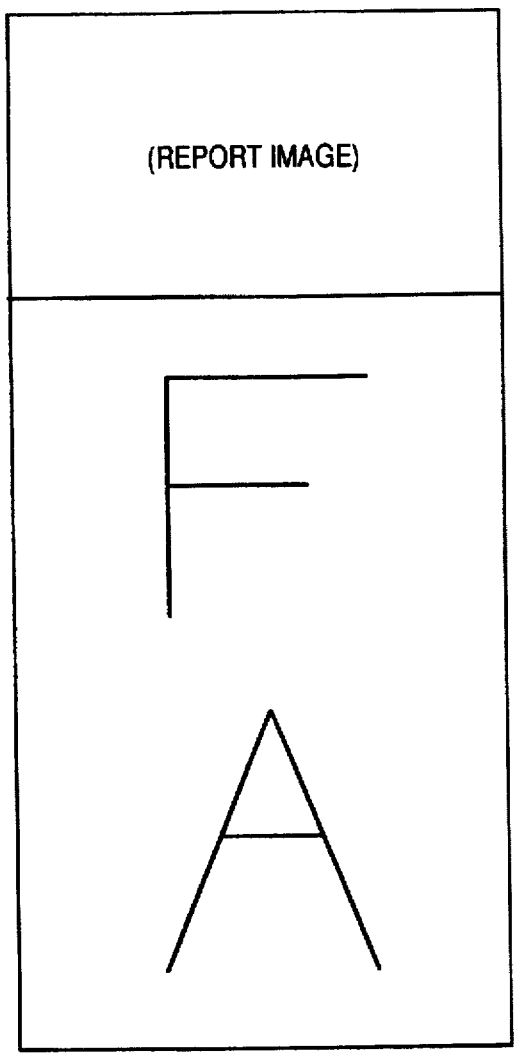
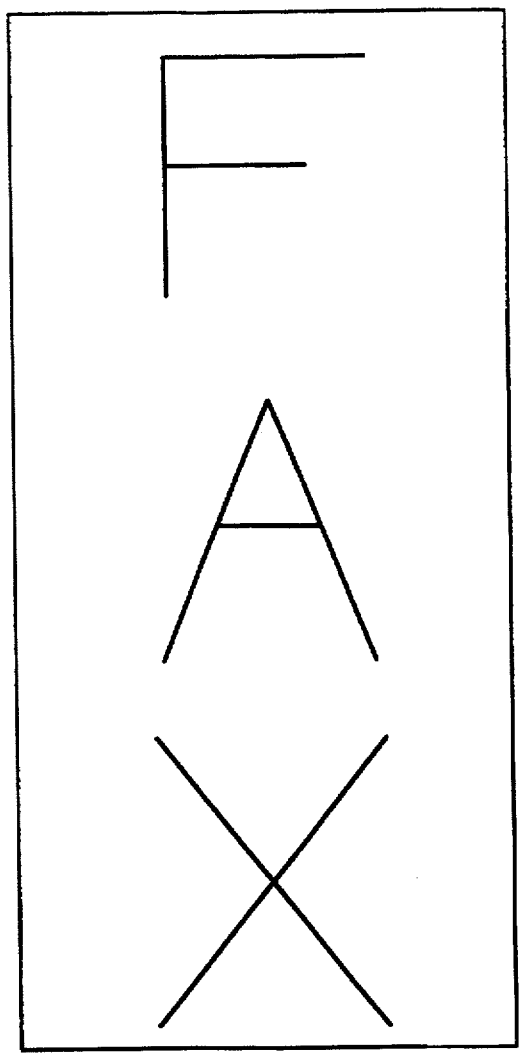

FACSIMILE APPARATUS AND METHOD OUTPUTTING RESULTS OF FACSIMILE COMMUNICATION

This application is a continuation of application Ser. No. 08/225,974, filed Apr. 12, 1994 abandoned.

BACKGROUND OF THE INVENTION

This invention relates to a method of outputting results of facsimile communication in a facsimile apparatus capable of outputting a communication report, as well as to the facsimile apparatus.

A facsimile apparatus is available in which a communication-error report or a report of communication results is outputted as a report accompanied by an image, namely a report in which a communication image is added to the part of a report that indicates the communication date and the communicating party. The reason for such an arrangement is that such an apparatus has the following advantages:

(a) When a plurality of transmissions are made to the same party in the memory transmission mode and the results of communication in a certain transmission among these transmissions indicate an error, it is easy to determine which transmission of a document gave the error results.

(b) By outputting a report irrespective of the communication results in the memory transmission mode, the report serves as proof indicating whether or not the transmission of a required document was made with certainty.

In a case where the report is accompanied by an image, only image data in an amount capable of following the report text is outputted in a form appended to the report. Consequently, if the report text is added to an A4 image, for example, and the result is printed out on A4 paper, a portion of the image equivalent to the size of the report will be left out. An example in which part of the communication data has thus been lost is illustrated in FIG. 9(A). In FIG. 9, the image that results owing to omission of the lower one-third of the image illustrated in FIG. 9(B) is added to the report.

The omission of the image portion not only results in an unattractive appearance but also detracts greatly from the merits of a report accompanied by an image. If a distinctive portion of the image happens to be omitted, there is the possibility that even the report accompanied by the image will be rendered meaningless.

In order to avoid this problem, it has been contemplated to output the report by dividing it into two or more pages. However, this is impractical since it is wasteful of recording paper and results in the report being scattered over several pages.

Further, an arrangement is conceivable in which a report accompanied by an image is printed out on recording paper having a size greater than that of the image size. However, this also is wasteful of recording paper. In addition, if the report is larger than the maximum size of the recording paper, this approach becomes entirely meaningless.

SUMMARY OF THE INVENTION

An object of the present invention is to provide a facsimile apparatus, as well as a method of outputting the results of facsimile communication, in which a report accompanied by an image can be printed out on a single sheet of recording paper without part of the image being left out.

According to the present invention, the foregoing object is attained by providing a facsimile apparatus capable of outputting a report of communication results, comprising an accumulating memory for storing communication image data, a communication management-data storage unit for storing communication management data, and output means for combining and outputting prescribed data within the communication management-data storage unit and prescribed communication image data within the accumulating memory, the output means applying necessary zoom processing to the communication image data to be combined and combining the prescribed data within the communication management-data storage unit and the prescribed communication image data within the accumulating memory in such a manner that this data will fit on one page.

In the arrangement described above, an attractive report of communication results without part of an image being omitted can be printed out on one page.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 9A and 9B are diagrams illustrating an example in which a portion of communication data, which is a report output, is omitted according to the prior art.

DESCRIPTION OF THE PREFERRED EMBODIMENTS

Embodiments of the present invention will now be described in detail with reference to the drawings.

[First Embodiment]

Figure 1:
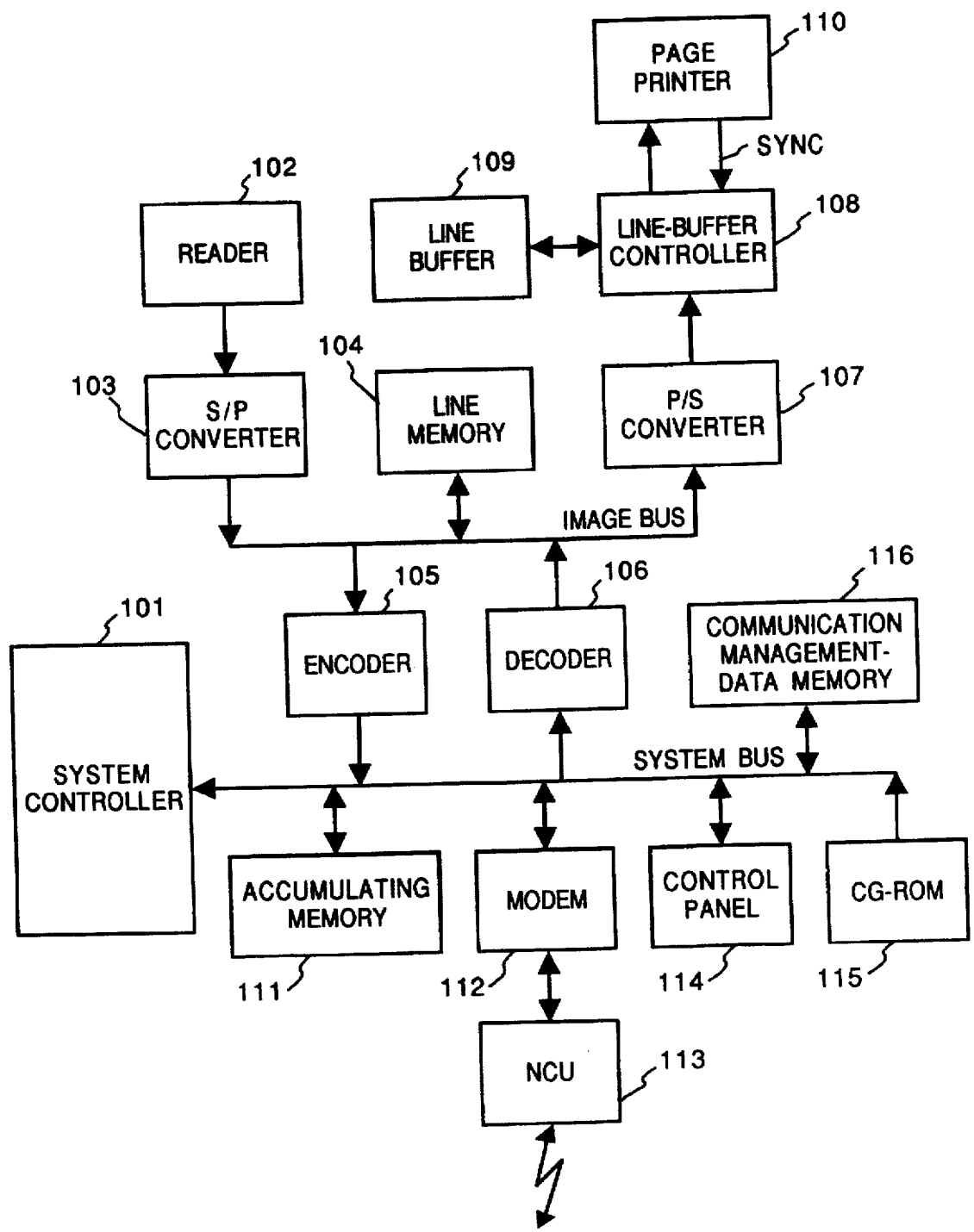
FIG. 1 is a block diagram illustrating a facsimile apparatus according to an embodiment of the present invention.

FIG. 1 is a block diagram illustrating an LBP facsimile apparatus according to an embodiment of the present invention.

As shown in FIG. 1, the facsimile apparatus includes a system control unit 101 comprising a CPU, ROM, RAM, etc., for supervising overall control of the apparatus according to this embodiment, a reader 102 for reading an original by means of an image sensor such as a CCD and outputting pixel data as serial binary data, and a serial/parallel (S/P)

converter 103 for converting serial data from the reader 102 into parallel data and storing the parallel data in a line memory 104, which temporarily stores a plurality of lines of pixel data.

The apparatus further includes an encoder 105 for reading prescribed pixel data from the line memory 104 and subjecting the pixel data to compression processing at high speed, a decoder 106 for decoding the encoded data, which has been read out of an accumulating memory 111, at high speed and storing the decoded pixel data in the line memory 104, and a parallel/serial (P/S) converter 107 for reading prescribed pixel data from the line memory 104 and outputting the data as a serial signal. The parallel/serial converter 107 executes main-scan reduction processing, in which a pixel is eliminated every number of prescribed pixels as necessary.

A line-buffer controller 108 executes first and second processing in parallel. The first processing involves accepting the output of the parallel/serial converter 107 as input data, converting this data to parallel data and storing the parallel data in a line buffer 109. The second processing involves reading already stored pixel data from the line buffer 109 successively in synchronization with a line synchronizing signal SYNC from a page printer 110, converting this pixel data to serial pixel data and outputting the same. The line buffer 109 temporarily stores a plurality of lines of the pixel data for printing.

The page printer 110, which comprises a laser-beam printer, for example, outputs the synchronizing signal SYNC of a fixed period every printing line and prints the serial pixel data outputted by the line buffer 109. The accumulating memory 111 stores image data as compressed-code data. A modem 112 is for transmitting and receiving data through a line, a network control unit (NCU) 113 controls an electrical interface with the line, a control panel 114 comprises operating buttons and a display, a character generator ROM (CG-ROM) 115 stores character-font data, and a communication management-data storage unit 116, which is constituted by a RAM, stores various data relating to communication.

The synchronizing signal SYNC from the page printer 110 is a one-line synchronizing signal.

It should be noted that the average time required by the decoder 106 for the decoding of one line shall always be shorter than the time needed for the page printer 110 to print one line.

[Memory Transmission]

Memory-transmission processing in the facsimile apparatus of the embodiment constructed as set forth above will now be described.

First, the data read by the reader 102 is converted to parallel data by the S/P converter 103 and the resulting parallel data is stored successively in the line memory 104.

Meanwhile, the encoder 105 successively encodes read data, which has been stored in the line memory 104, and accumulates the encoded data in the accumulating memory 111. Thus, a full transmission of an original is stored in the accumulating memory 111. When this is carried out, the number of lines of data of the read original is counted and stored in the communication management-data storage unit 116.

Next, the modem 112 and NCU 113 are started to call a communicating party and establish a call with the party's communication apparatus. When a communication line to the party has been acquired, the decoder 106 decodes the transmission image data, which has been accumulated in the accumulating memory 11, into image data and then stores this image data in the line memory 104. The pixel data thus decoded is now encoded again by the encoder 105 in conformity with a prescribed code suited to the capability of the other party's receiving unit. The resulting signal is then transmitted to the other party's receiving unit on the line via the modem 112 and NCU 113.

[Reception]

A facsimile reception operation will now be described.

In a reception operation, the speed at which code data arrives from a line and the printing speed of the page printer 110 do not agree. Accordingly, two types of processing are executed independently, namely (1) the received code data is accumulated in the accumulating memory 111, and (2) one page of an image that has been stored in the accumulating memory 111 is printed.

First, in processing (1), the portion of the code data received from the apparatus on the transmitting side and obtained via the NCU 113 and modem 112 is sequentially decoded by the system controller 101, an error code is detected, the number of normal lines constituting one page is counted and the number is stored. The received image that has been decoded correctly is successively decoded by the system controller 101 in accordance with a predetermined encoding format and the results are stored in the accumulating memory 111.

The reason for counting and storing the number of correct lines is to decide, prior to the start of printing, how many pages of recording paper one received page should be divided into before being printed. This is required because the printing section is a page printer.

When one page of the received image to be printed has thus been stored in the accumulating memory 111, execution of processing (2) is started. First, the image code data that has been stored in the accumulating memory 111 is read out and sent to the decoder 106, where the data is decoded. The decoded data is stored in the line memory 104 in successive fashion. One line of the stored pixel data is converted to serial data by the parallel/serial converter 107, whence the serial data is sent to the line-buffer controller 108. The latter stores this serial data in the line buffer 109.

The above-described decoding processing, P/S conversion processing and processing for storing data in the line buffer is executed in sequence whenever space develops in the line buffer 109.

In parallel with the above-described processing, the line-buffer controller 108 successively reads out the received image data, which has been stored in the line buffer 109, and outputs the data to the page printer 110, in synchronization with the horizontal synchronizing signal SYNC of the fixed period produced by the page printer 110. The signal SYNC requests output of one line of the print data. If necessary, the line-buffer controller 108 reads out and delivers the same line of data several times in dependence upon the resolution of the received image (these are referred to as interpolated lines, as opposed to original lines).

The operating speed of the page printer 110 is fixed. For this reason, the above-mentioned decoding processing, P/S conversion processing and processing for storing data in the line buffer is executed in the order mentioned in such a manner that the line buffer 109 will not run out of print data during the printing time of one page of recording paper. As a result, data can be printed out by the page printer 110 at a constant speed even through a page buffer is not provided.

[Copy Processing]

The operation from reading of the original to storage of the image data in the accumulating memory 111 is the same as the accumulating operation in memory transmission described above.

In the printing operation, this is identical to the processing (2) in the reception operation described above. A detailed description is therefore omitted.

[Report Printout]

Report printout processing, which is processing peculiar to the apparatus of this embodiment, will now be described with reference to the flowchart of FIG. 2. Report printout processing will be described taking as an example the printing of a report of results of communication. However, the present invention is applicable to printout of all types of reports relating to facsimile apparatus, such as a report giving an account of transmission data accumulated in the accumulating memory 111.

Figure 2:
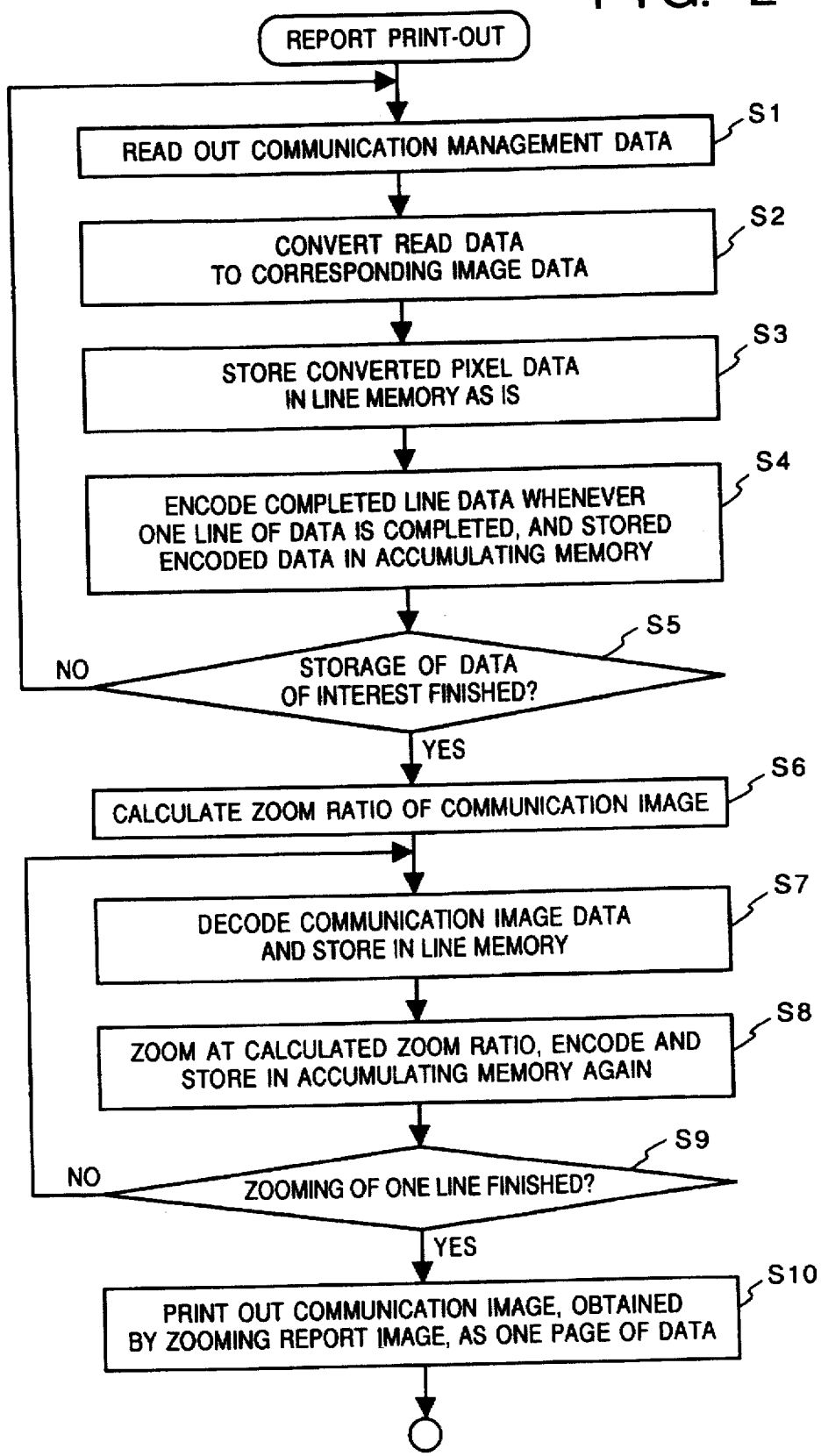
FIG. 2 is a flowchart illustrating processing for printing a report according to this embodiment.

First, at step S1 of the flowchart in FIG. 2, the system controller 101 extracts prescribed data (communication date and time, communicating party's telephone number, number of pages of communication image, etc.) from the communication management-data storage unit 116, in which data of interest has been stored. Then, at step S2, the system controller 101 supplies the read data to the CG-ROM 115 and extracts pixel data for creating an image corresponding to each item of data. Next, at step S3, the decoder 106 is set to a pass-thru mode (a mode in which an input is passed through the decoder without being decoded), pixel data from the CG-ROM 115 is sent to the line memory 104 as is and image data of one line is created in successive fashion.

Whenever one line of data is completed, the line is sent to the encoder 105 so as to be subjected to encoding processing in successive fashion, and the encoded data is stored in the accumulating memory 111 at step S4. Further, the number of lines of the report image thus encoded is counted. This is followed by step S5, at which it is determined whether the entirety of the report image of interest has been stored in the accumulating memory 111. When it is determined that all of the required report image of communication results has not been stored in the accumulating memory 111, the program returns to step S1 so that processing for storing the next line of pixel data in the accumulating memory 111 is executed.

When it is found at step S5 that the entire report image of interest has been recorded in the accumulating memory 111, zoom processing in the sub-scan direction of an image added to a report is executed from step S6 onward. First, magnification (R) of a communication image is decided at step S6. More specifically, magnification (R) of a communication image is decided as indicated by the following equation, by way of example, based upon a number of lines (n1) of a report image stored in the accumulating memory 111, number of lines (n2) of the communication image, pixel density (d1) of the report image, pixel density (d2) of the communication image, pixel density (d3) of the recording portion and size (L) of the recording paper:

$$R=[L-m)-n1/d1]/(n2/d2) \times (d3/d2) \quad \ldots \text{Eq. (1)}$$

where m represents the length of image omission from the leading edge or trailing edge of the recording paper.

Next, communication image data that has been stored in the accumulating memory 111 is read out at step S7 and decoding processing is executed by the decoder 106 so that the image data is developed in the line memory 104. When development of one line ends, the program proceeds to step S8, at which it is determined whether thinning-out of developed lines has been performed in dependence upon the zoom ratio decided earlier, the data that has been thinned out is subjected to encoding processing again by the encoder 105 and the encoded data is stored in the accumulating memory 111.

Next, at step S9, it is determined whether zoom processing of one page of the communication image data has ended. If processing of one page of the communication image data has not ended, the program returns to step S7, at which zoom processing of the next line of communication image data is executed. When this operation is repeated and the zoom processing of one page of communication image data ends, the program returns to step S10, at which the report image and the communication image that has been subjected to zoom processing are read out of the accumulating memory consecutively, the two images are connected and the result is printed out by the page printer 110 as a report accompanied by an image. In this printing processing, printing is performed in the same manner as printing processing in the above-described reception operation and copying operation.

Figure 3:
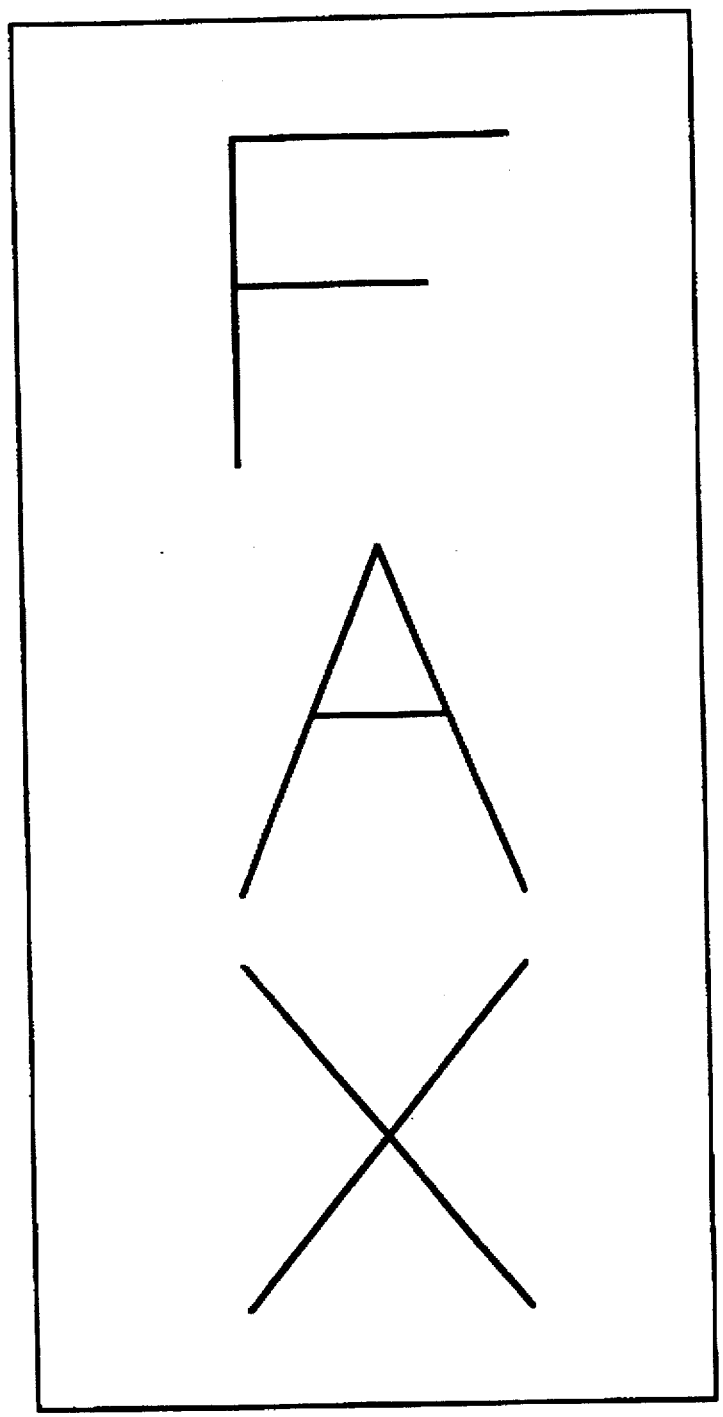
FIG. 3 is a diagram showing an example of the accumulation of one page of a communication image in an accumulation memory.
Figure 4:
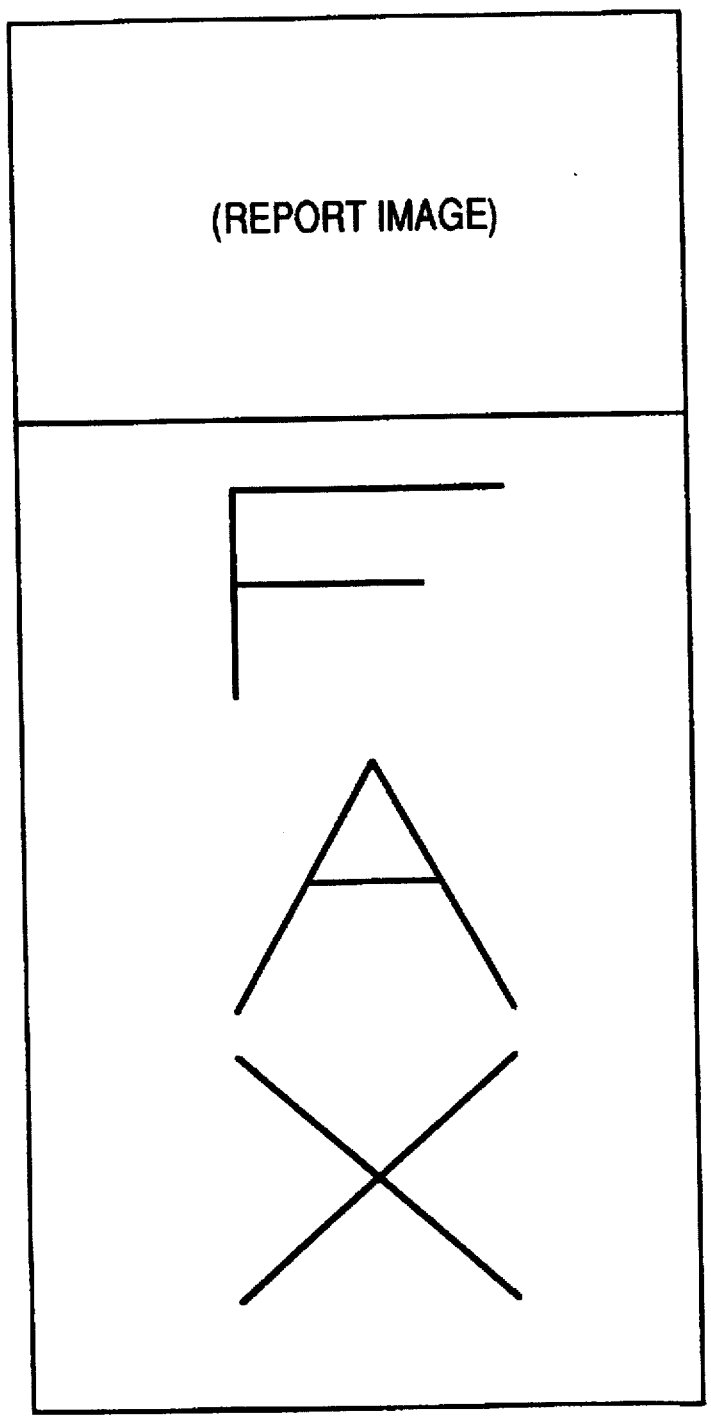
FIG. 4 is a diagram showing an example of the accumulation of one page of a communication image in an accumulation memory according to this embodiment.

FIG. 3 illustrates an example of an image obtained by accumulating communication image data in the accumulating memory in this embodiment, and FIG. 4 illustrates an example in which a report image is combined with the accumulated image of FIG. 3 and outputted as one page of data. As shown in FIG. 4, it is possible to print a report, which is accompanied by an image, on a single sheet of recording paper by subjecting the accumulated image portion to zoom processing. The image appears in full without any portions being left out, and a report on the results of communication is appended to the image.

An example in which zoom processing is performed in the sub-scan direction is described above. However, zoom processing in the main-scan direction can also be performed in the manner set forth below.

Specifically, in zoom processing in the main-scan direction, the report-image code in the accumulating memory 111 is decoded by the decoder 106 and pixels are thinned out in conformity with a prescribed zoom ratio when the decoded results are successively stored in the line memory 104.

In accordance with this embodiment, as described above, the page printer 110, such as a laser-beam printer, which prints single lines at a constant speed, is adopted as the recording system, and a data supply section is provided to supply pixel data at a speed higher than that at which the recording section prints. As a result, the printer buffer can be made a line buffer, which stores several lines, rather than a page buffer that develops one page of an image as pixel data. This makes it possible to lower cost.

Further, when data is read out of the printer buffer (line buffer 109) and printed by the printing section in concurrence with the supply of data to the printer buffer, image data is stored in the accumulating memory 111 again after the image data is subjected to zoom (reduction) processing in the accumulating memory 111, and the resulting image is combined with the report portion and printed. As a result, it is possible to print out a report, which is accompanied by an image, on a single sheet of recording paper. Specifically, the report is appended to the full image.

[Second Embodiment]

In the second embodiment also, the system configuration and the operations for memory transmission, reception and copying are the same as in the first embodiment and need not be described again. Further, the blocks of the apparatus are substantially the same at those of the first embodiment shown in FIG. 1. The second embodiment differs from the first embodiment in terms of the construction of the line-buffer controller 108. The line-buffer controller of the second embodiment of the invention incorporates a printing-zoom control circuit shown in FIG. 5.

Figure 5:
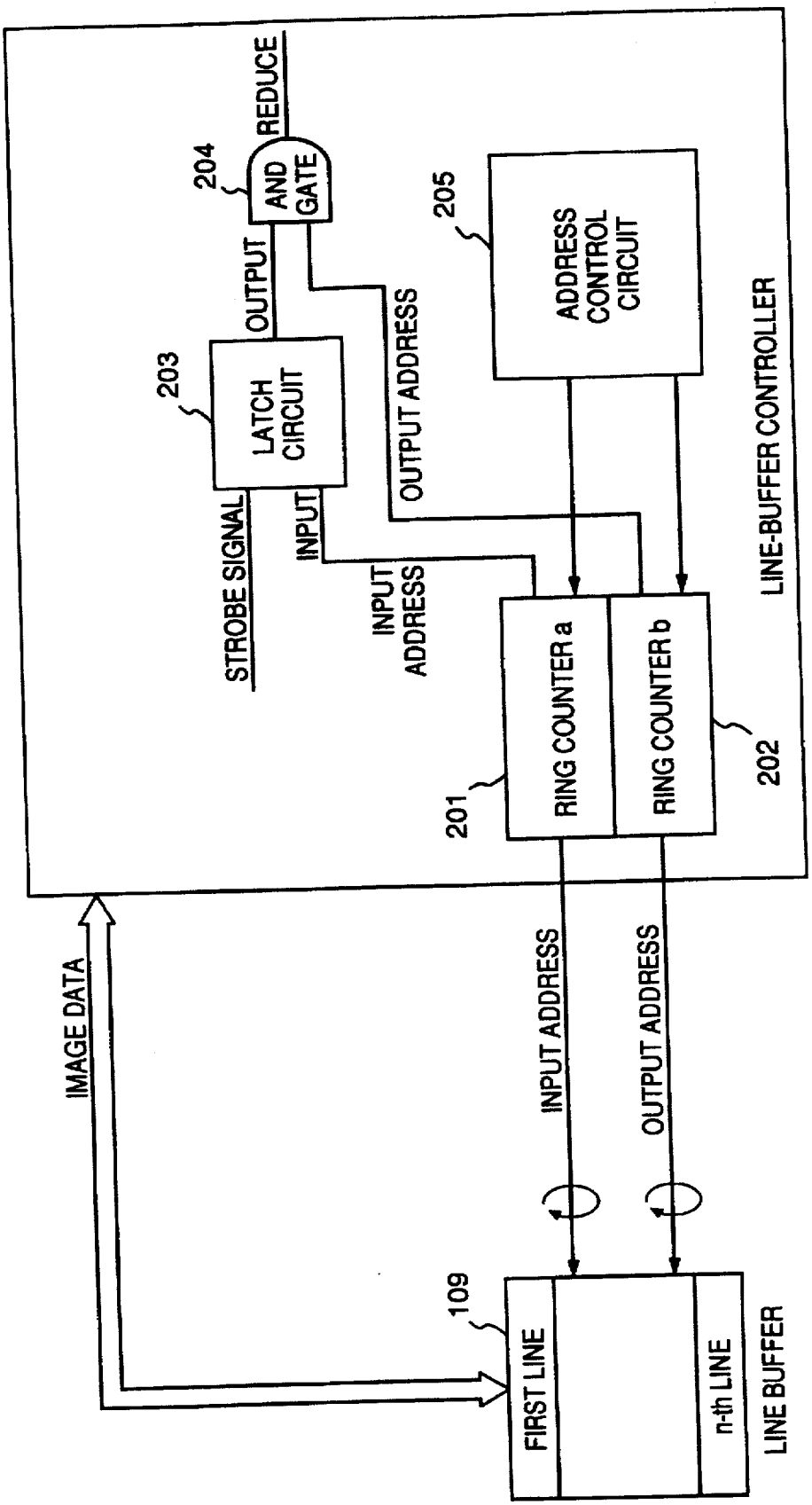
FIG. 5 is a diagram showing the detailed construction of a line-buffer controller in a second embodiment of the present invention.

In FIG. 5, numeral 201 denotes a ring counter a for counting a data input address to the line buffer 109, 202 a ring counter b for counting a data output address from the line buffer 109, and 203 a latch circuit for latching the address, which has been recorded by the ring counter a201, in response to a STROBE signal. Further, numeral 204 denotes an AND gate for comparing the input address latched by the latch circuit 203 and the output address recorded by the ring counter b, and outputting a REDUCE signal when the compared addresses agree. Numeral 205 denotes an address control circuit for controlling input/output addresses of data to the line buffer 109.

The STROBE signal is a signal for holding the address that prevails at the end of the report portion. This signal is transmitted with the end of decoding of the report portion and transfer of data to the line buffer 109. The REDUCE signal is for applying zoom processing to the subsequent data. This signal is outputted with the end of transfer of the report pixel data to the page printer 110.

[Report Printout]

Control of report printout according to the second embodiment constructed as set forth above will now be described.

First, the system controller 101 extracts prescribed data from the communication management-data storage unit 116, in which data of interest has been stored. Then, in order to create an image corresponding to each item of data, the system controller 101 extracts pixel data from the CG-ROM 115 and sets the decoder 106 to the pass-thru mode (a mode in which an input is passed through the decoder without being decoded) to successively create one line of image data in the line memory 104.

Whenever one line of data is completed, the line is subjected to encoding processing by the encoder 105 and the encoded data is stored in the accumulating memory 111. Further, the number of lines of the report image thus encoded is counted. The entirety of the report image of interest is completed in the accumulating memory 111. Further, as described in the first embodiment, the number of lines of the report image that has been subjected to encoding processing is counted. Thereafter, the processing set forth below is executed for zooming in the sub-scan direction of the image added to the report.

First, the zoom ratio of the communication image is decided in the same manner as described in the first embodiment. Next, the report image and the communication image are joined to obtain a report with an accompanying image, and zoom processing in the sub-scan direction of printing is executed between the report image portion and the communication image portion while printing is in progress. The details of this processing will now be described.

First, code data indicative of the report image in the accumulating memory 111 is decoded by the decoder 106 and the decoded data is stored in the line memory 104 in successive fashion. One line of the stored pixel data is converted to serial data by the parallel/serial converter 107 and the serial data is sent to the line-buffer controller 108. The line-buffer controller 108 stores the above-mentioned data in the line buffer 109.

The foregoing decoding, P/S conversion and storage of data in the line buffer are executed successively whenever space develops in the line buffer 109. When this operation is repeated and the development of the report portion into pixel data as well as the storage of the data in the line buffer 109 ends, the strobe signal is transmitted to the line-buffer controller 108 so as to strobe the address (the data of the ring counter a) of the line buffer 109, in which the last line of data of the report has been stored. The input address is latched in the latch circuit 203.

When the development of the report portion into pixel data ends, the communication image data is then developed into pixel data and stored in the line buffer 109 through processing similar to that just described.

The timing of zoom processing will now be described.

The address (the data in ring counter b) of data readout from line buffer 109 and the data latched in the latch circuit 203 are compared. When the two are equal, a zoom signal is issued and zoom processing is executed from the next line. Zoom processing in the main-scan direction can be carried out in the same manner as set forth in the first embodiment.

Figure 6:
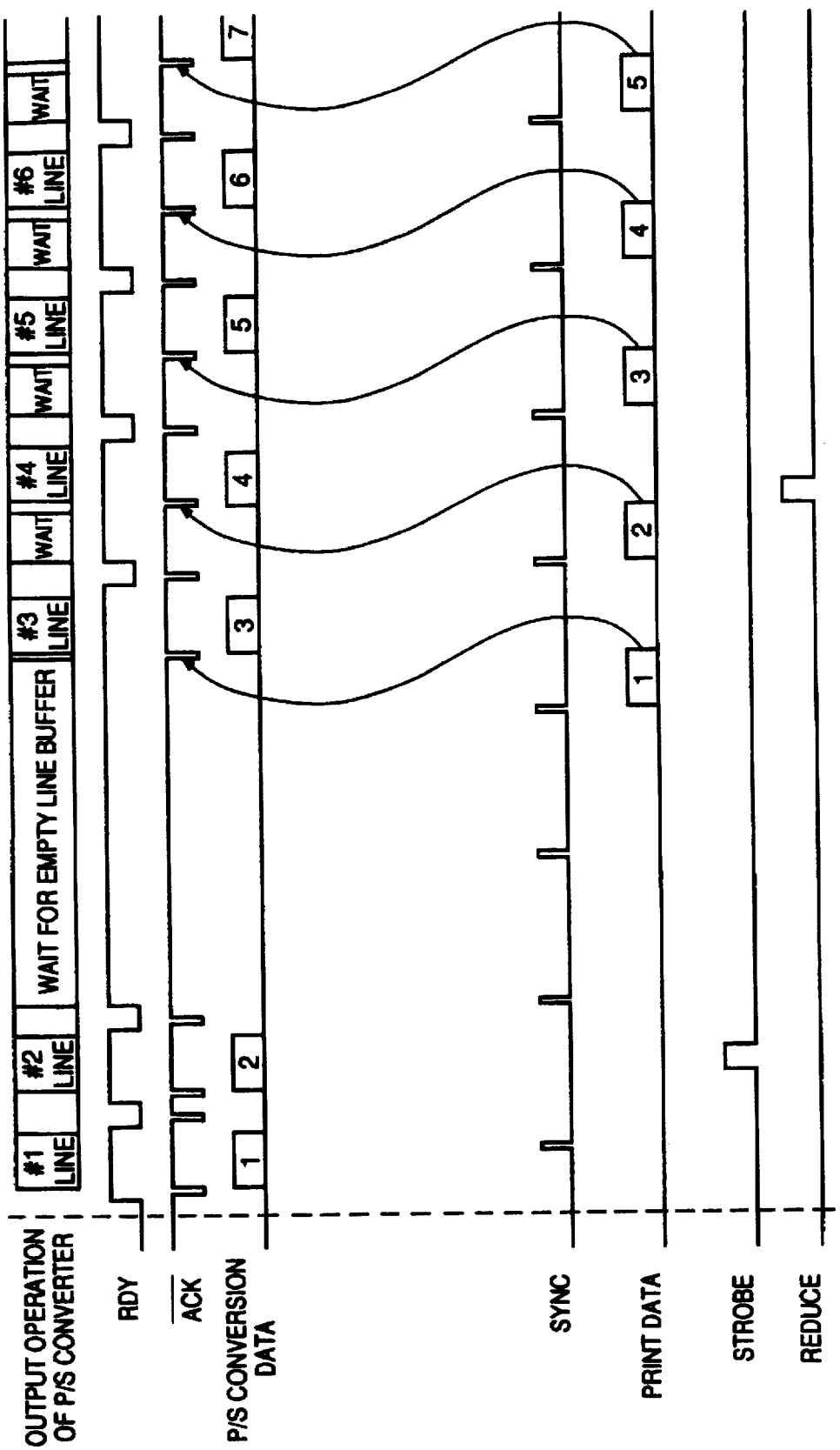
FIG. 6 is a timing chart showing an example of a zoom control operation in the line-buffer controller of the second embodiment.

FIG. 6 is a timing chart of the control described above.

In accordance with the second embodiment, as described above, it is possible to print a report, which is accompanied by an image, on a single sheet of recording paper. The report appears in a form appended to the full area of an image. Further, in a case where the pixel density of print image data is lower than the pixel density of the printer, zoom processing in the sub-scan direction is not performed by thinning out the original data in the image memory but is executed by thinning out only interpolated line data, thereby making it possible to prevent omission of lines of the print image. Moreover, in this case also, the capacity of the image memory in enlarging processing need only be equivalent to the volume of original encoded data. As a result, zoom processing with minimum image omission can be executed using minimal memory.

[Third Embodiment]

In the third embodiment also, the system configuration and the operations for memory transmission, reception and copying are the same as in the foregoing embodiments and need not be described again. Further, the blocks of the apparatus are substantially the same at those of the first embodiment shown in FIG. 1. The third embodiment differs in terms of the construction of the line-buffer controller 108.

Figure 7:
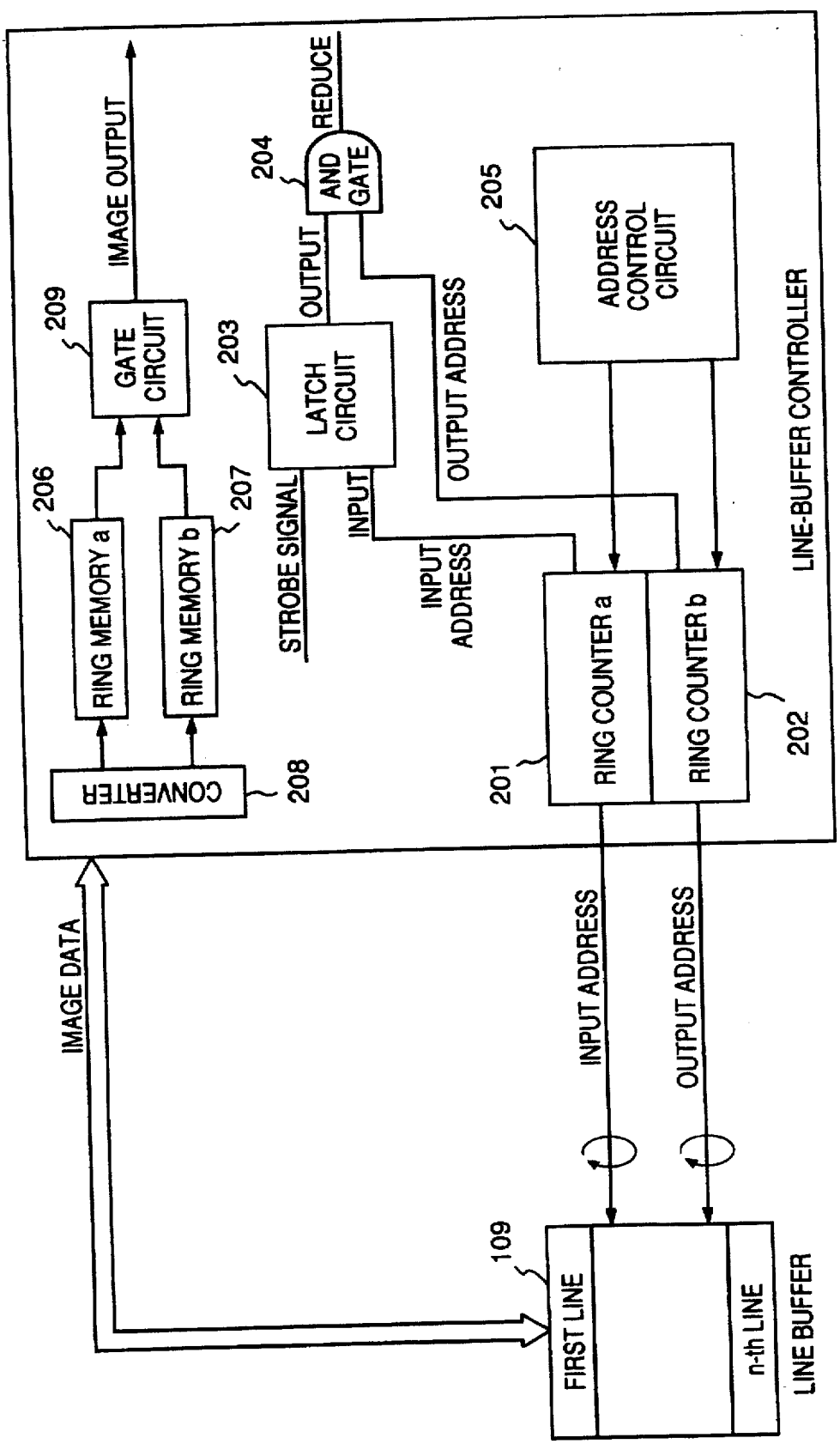
FIG. 7 is a diagram showing the detailed construction of a line-buffer controller in a third embodiment of the present invention.

In the third embodiment, the line-buffer controller has the construction shown in FIG. 7. Here components identical with those of the second embodiment shown in FIG. 5 are designated by like reference numerals and need not be described in detail again.

The line buffer control circuit shown in FIG. 7 incorporates, in addition to the printing-zoom control circuit of FIG. 5, a ring memory a206 and a ring memory b207 for storing one line of print data, a converter 208 for subjecting image data read out of the line buffer 109 to a bit conversion, and a gate circuit 209.

The ring memory a206 stores the data read out of the line buffer 109 and bit-converted by the converter 208. Alternating with the ring memory a206, the ring memory b207 stores the data read out of the line buffer 109 and bit-converted by the converter 208. The converter 208 applies the bit conversion to the image data read out of the line buffer 109. The gate circuit 209 alternates between the ring memory a206 and ring memory b207 to output the stored data to the page printer 110.

In the third embodiment, zoom processing in the main-scan direction can be carried out as set forth below by providing the two ring memories a206 and b207. The line-buffer controller 108 successively reads out the received image data, which has been stored in the line buffer 109, and outputs the data, in synchronization with a vertical synchronizing signal SYNC of a fixed period produced by the page printer 110. The signal SYNC requests output of one line of the print data. When printing is performed at a 1:1 ratio, only conversion processing for attaining conformity with the resolution of the page printer 110 is performed in dependence upon the resolution of the print image (the conversion is from original pixel bits to plural-bit data).

Zoom processing is executed, at the time of the bit conversion, in dependence upon a zoom ratio determined by the following equation based upon the main-scan density of the print image, the main-scan recording density of the recording section and the zoom ratio of the image, the two ring memories are used alternately to store data, and print pixel data is outputted to the page printer 110 alternately from the two ring memories:

zoom ratio=(main-scan recording density of recording section)÷(main-scan density of print image)×(zoom ratio of image) ... Eq. (2) For example, we have zoom ratio=400 ÷100×0.7=2.8 when the following holds:

main-scan density of print image=100 dpi main-scan recording density of recording section=400 dpi zoom ratio of image=0.7

More specifically, though it appears that reduction processing is carried out at an image zoom ratio of 0.7, the actual processing is an enlargement processing operation in which a bit conversion is performed at such a ratio that one bit of an original pixel becomes 2.8 bits.

If the main-scan zoom method according to the third embodiment described above is adopted, size reduction by thinning out data after conversion of pixel density can be carried out even in a case where the pixel density of the print image data in the main-scan direction is less than the pixel density of the printer. In addition, the pattern of bit conversion can be changed depending upon the zoom ratio. As a result, zoom processing having a higher quality than that of the foregoing embodiments can be executed.

[Fourth Embodiment]

The foregoing description relates to an example in which the printer buffer of a page printer 110 is equipped with the line buffer 109 having a memory of several lines, wherein page printing using a small memory capacity is made possible. However, the invention is not necessarily limited to this example. An arrangement may be adopted in which the printer buffer of the page printer 110 is constituted by a page buffer having a storage capacity of at least one page. In such case the processing speed of the decoder 106 will not be limited by the printing speed of the page printer 110.

Figure 8:
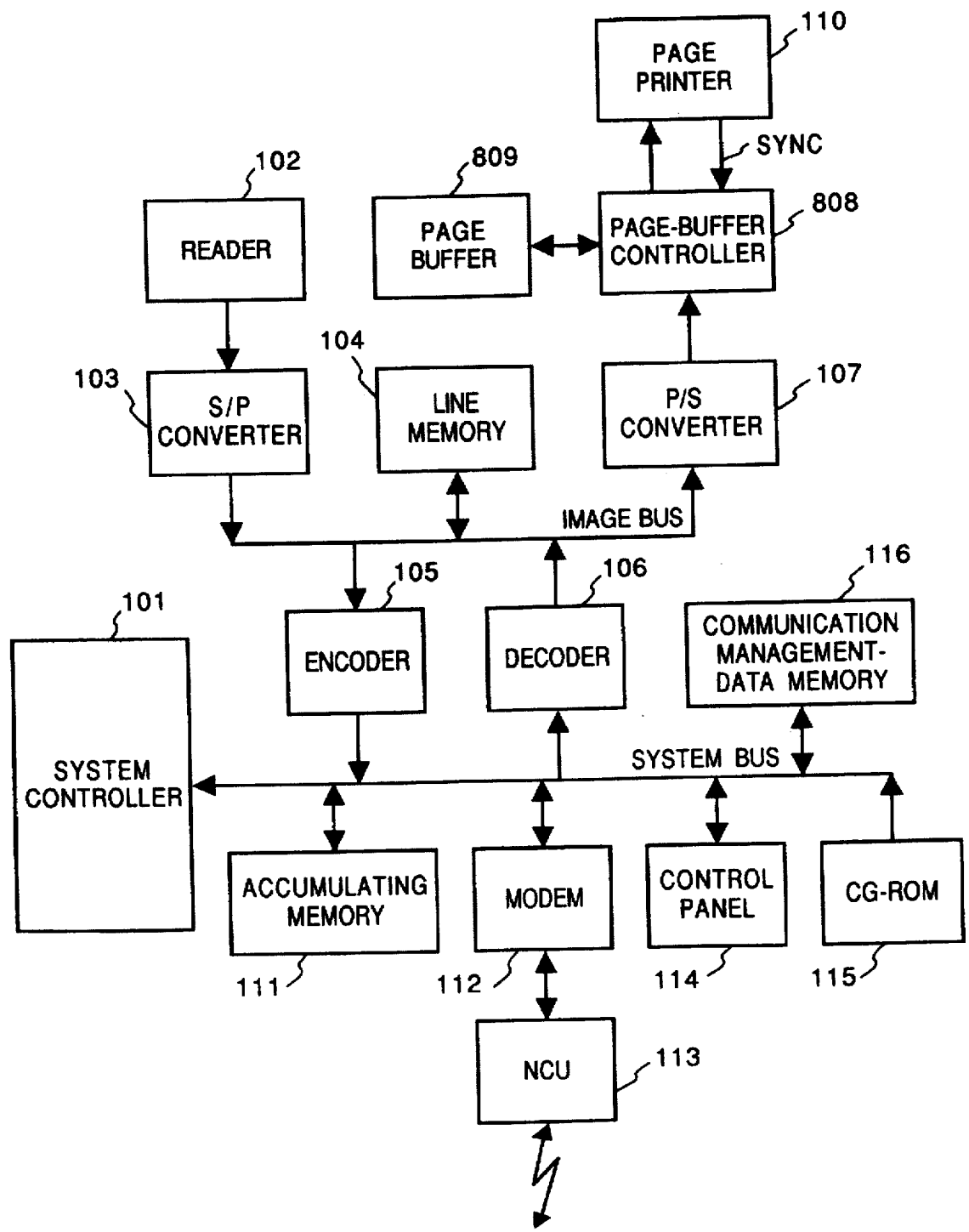
FIG. 8 is a diagram showing the detailed construction of a line-buffer controller in a fourth embodiment of the present invention.

FIG. 8 is a block diagram showing the construction of a fourth embodiment according to the invention in which the printer buffer of the page printer 110 is constituted by a page buffer having a storage capacity of at least one page. The embodiment of FIG. 8 differs from that of FIG. 1 in that a page-buffer controller 808 is provided instead of the line-buffer controller 108, and a page buffer 809, which temporarily stores at least one page of print pixel data, is provided instead of the line buffer 109.

In the fourth embodiment illustrated in FIG. 8, the page-buffer controller 808 accepts the output of the parallel/serial converter 107 as input data, converts the input data to parallel data and stores the parallel data in the page buffer 809. Execution of this first processing continues until development of one page ends. At the time of print-out, pixel data that has already been stored is read out of the page buffer 809 successively in synchronization with the vertical synchronizing signal SYNC from the page printer 110 following the end of development of at least one page, this pixel data is converted into serial pixel data and the serial pixel data is outputted to the page printer 110.

Consequently, in processing for printing out received data, copy processing and report printing processing, the page-buffer controller 808 successively develops data to be printed in the page buffer 808 until the development of one page of an image ends, and the developed data is subsequently sent to the page printer 110 and printed out successively in page units.

In accordance with the fourth embodiment as described above, it is possible to print out, on a single sheet of recording paper, a report accompanied by an image, wherein the report is added on to the full area of the image.

The present invention can be applied to a system constituted by a plurality of devices or to an apparatus comprising a single device. Furthermore, it goes without saying that the invention is applicable also to a case where the object of the invention is attained by supplying a program to a system or apparatus.

In accordance with the embodiments described above, a report accompanied by an image can be printed out on a single sheet of recording paper without part of the image being left out.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus capable of outputting a report of results of communication, comprising:

code memory means for storing coded image data to be printed;

communication management data storage means for storing communication management data;

encoding means for generating coded management data based on the communication management data stored in said communication management data storage means;

decoding means for decoding the coded image data read out from said code memory means and the coded management data generated by said encoding means to generate pixel data;

line buffer memory means for storing a plurality of lines of pixel data from said decoding means;

page printing means for printing each line of the pixel data, read out from said line buffer memory means, for a page of an image, said page printing means printing each line within a constant time regardless of an information content of each line, wherein said decoding means decodes the code data for each line within a respective time shorter than the constant time regardless of an information content of each line; and output means for successively outputting the coded management data and the coded image data to said decoding means, wherein said output means applies a zoom processing to the coded image data, and combines the management data and the zoom-processed image data in such a manner that the image data and the communication management data are combined to form combined data and the combined data fits on one page.

2. The apparatus according to claim 1, wherein said output means executes the zoom processing at different magnifications for the coded image data and communication management data.

3. The apparatus according to claim 1, wherein said output means executes the zoom processing by thinning out lines and thinning out pixels.

4. The apparatus according to claim 1, wherein said output means subjects the image data to the zoom processing.

5. The apparatus according to claim 1, wherein printing recording is performed by said page printer means for printing one line at a constant speed;
said output means supplying print data to said line buffer memory means at a speed higher than that at which said page printer means prints, and
said page printer reading out print data successively in parallel with the supply of print data to said line buffer memory means by said output means.

6. The apparatus according to claim 1, wherein said code memory means further stores coded management data.

7. The apparatus according to claim 6, wherein said decoding means decodes coded data so that said line buffer memory means keeps valid pixel data while said page printing means is printing a page of an image.

8. The apparatus according to claim 6, wherein said code memory means stores coded image data representing a received document image and code data representing management data concerning the received document image.

9. The apparatus according to claim 6, wherein said code memory means stores coded image data representing an undelivered document image and code data representing management-data concerning the undelivered document image.

10. The apparatus according to claim 6, wherein said page printing means includes a laser beam printer.

11. A method of operating a facsimile apparatus capable of outputting a report of results of communication, comprising:
storing coded image data to be printed;
storing communication management data;
encoding the stored communication management data to generate coded management data;
decoding the stored coded image data and the coded management data to generate pixel data;
storing a plurality of lines of pixel data from said decoding step in a line buffer memory;
printing each line of the pixel data, read out from the line buffer memory in a constant time per line regardless of an information content of each line, wherein said decoding step decodes the code data for each line within a respective time shorter than the constant time regardless of an information content of each line; and
successively outputting the coded management data and the coded image data for said decoding step,
wherein said outputting step applies a zoom processing to the coded image data, and combines the management data and the zoom-processed image data in such a manner that the image data and the communication management data are combined to form combined data and the combined data fits on one page.

12. The method according to claim 11, wherein the zoom processing is executed at different magnifications for the coded image data and coded management data.

13. The method according to claim 11, wherein the zoom processing is executed by thinning outlines and thinning out pixels.

14. The method according to claim 11, wherein the image data is subjected to the zoom processing.

15. The method according to claim 11, wherein the coded management data is stored with the coded image data.

16. The method according to claim 11, wherein printing recording is performed by printing each line at a constant speed,
said output step supplying print data to the line buffer memory at a speed higher than that at which said page printer step prints, and
said page printer step reading out print data successively in parallel with the supply of print data to the line buffer memory by said output step.

17. The method according to claim 16, wherein said decoding step decodes the code data so that the line buffer memory keeps valid pixel data while said page printing step is printing a page of an image.

18. The method according to claim 16, wherein the stored coded data includes coded data representing a received document image and code data representing management data concerning the received document image.

19. The method according to claim 16, wherein the stored coded data includes coded data representing an undelivered document image and code data representing management data concerning the undelivered document image.

20. The method according to claim 16, wherein said page printing step uses a laser beam printer.

21. A method of operating a facsimile apparatus capable of outputting a report of results of communication, comprising:
storing coded lines of first image data representing a first image to be printed on one page;
storing communication management data relating to the first image;
encoding the stored communication data as coded lines of second image data representing a second image and storing the coded lines of second image data;
successively outputting the coded lines of second image data and the coded lines of first image data for decoding, where the coded lines of first image data are output as coded lines of zoom-processed first image data by applying a zoom-processing using a line memory at a magnification such that a third image represented by the coded lines of zoom-processed first image data and the second image will, when printed in combination, fit on one page;
decoding the output coded lines of second image data and the coded lines of zoom-processed first image data to generate pixel data;
storing a plurality of lines of the pixel data from said decoding step in a line buffer memory; and
printing each line of the pixel data, read out from the line buffer memory in a constant time per line regardless of an information content of each line, wherein said decoding step decodes the code data for each line within a respective time shorter than the constant time regardless of an information content of each line.

22. The method according to claim 21, wherein zoom-processing is applied to the coded lines of second image data in said outputting step at a magnification different from that for the coded lines of first image data.

23. The method according to claim 21, wherein the zoom-processing is executed by thinning out lines and thinning out pixels.

24. The method according to claim 21, wherein zoom-processing is applied to the coded lines of second image data in said outputting step.

25. The method according to claim 21, wherein the coded lines of first image data and the coded lines of second image data are stored in a common memory.

26. The method according to claim 21, wherein said page printing step is performed by printing each line at a constant speed, wherein said outputting step and said decoding step supply pixel data to the line buffer memory at a speed higher than that at which said page printing step prints, and wherein said page printing step reads out pixel data successively in parallel with the supply of pixel data to the line buffer memory.

27. The method according to claim 26, wherein said decoding step decodes the coded lines of first and second image data so that the line buffer memory keeps valid pixel data while said page printing step is printing a page.

28. The method according to claim 26, wherein the stored coded lines of first image data represent a received document image and the stored communication management data represents information concerning the received document image.

29. The method according to claim 26, wherein the stored coded lines of first image data represent an undelivered document image and the stored communication management data represents information concerning the undelivered document image.

30. The method according to claim 26, wherein said page printing step uses a laser beam printer.

31. A facsimile apparatus capable of outputting a report of results of communication, comprising:

code memory means for storing coded lines of first image data representing a first image to be printed on one page;

communication management data storage means for storing communication management data relating to the first image;

encoding means for encoding the stored communication data as coded lines of second image data representing a second image and storing the coded lines of second image data in memory;

outputting means for successively outputting the coded lines of second image data and the coded lines of first image data from memory for decoding, where the coded lines of first image data are output as coded lines of zoom-processed first image data by applying a zoom-processing using a line memory at a magnification such that a third image represented by the coded lines of zoom-processed first image data and the second image will, when printed in combination, fit on one page;

decoding means for decoding the output coded lines of second image data and the coded lines of zoom-processed first image data to generate pixel data;

line buffer memory means for storing a plurality of lines of the pixel data from said decoding means; and page printing means for printing each line of the pixel data, read out from said line buffer memory means in a constant time per line regardless of an information content of each line, wherein said decoding means decodes the code data for each line within a respective time shorter than the constant time regardless of an information content of each line.

32. The apparatus according to claim 31, wherein said outputting means applies zoom-processing to the coded lines of second image data at a magnification different from that for the coded lines of first image data.

33. The apparatus according to claim 31, wherein said outputting means executes the zoom-processing by thinning out lines and thinning out pixels.

34. The apparatus according to claim 31, wherein said outputting means applies zoom-processing to the coded lines of second image data.

35. The apparatus according to claim 31, wherein the coded lines of first image data and the coded lines of second image data are stored in said code memory means.

36. The apparatus according to claim 31, wherein said page printing means prints each line at a constant speed, wherein said outputting means and said decoding means supply pixel data to the line buffer memory means at a speed higher than that at which said page printing means prints, and wherein said page printing means reads out pixel data successively in parallel with the supply of pixel data to the line buffer memory means.

37. The apparatus according to claim 36, wherein said decoding means decodes the coded lines of first and second image data so that the line buffer memory means keeps valid pixel data while said page printing means is printing a page.

38. The apparatus according to claim 36, wherein the stored coded lines of first image data represent a received document image and the stored communication management data represents information concerning the received document image.

39. The apparatus according to claim 36, wherein the stored coded lines of first image data represent an undelivered document image and the stored communication management data represents information concerning the undelivered document image.

40. The apparatus according to claim 36, wherein said page printing means uses a laser beam printer.

* * * * *

UNITED STATES PATENT AND TRADEMARK OFFICE
CERTIFICATE OF CORRECTION

PATENT NO. : 5,724,157

DATED : March 3, 1998

INVENTOR(S) : ATSUSHI OTANI ET AL.

It is certified that error appears in the above-identified patent and that said Letters Patent is hereby corrected as shown below:

<u>COLUMN 4</u>

Line 67, "through" should read --though--.

<u>COLUMN 11</u>

Line 35, "management-data" should read --management data--.

Signed and Sealed this

Twenty-first Day of July, 1998

*Attest:*

BRUCE LEHMAN

*Attesting Officer*     Commissioner of Patents and Trademarks